United States Patent [19]

Crahay et al.

[11] 4,329,562
[45] May 11, 1982

[54] METHOD AND DEVICE FOR IMPROVING THE PROPERTIES OF THIN STEEL PLATES

[75] Inventors: Jean Crahay, Francorchamps; Christian Marique, Liege; Henri Bonnarens, Esneux; Rene DeFraye, Liege; Adolphe Bragard, Esneux, all of Belgium

[73] Assignee: Centre de Recherches Metallurgiques-Centrum voor Research in Metallurgie, Brussels, Belgium

[21] Appl. No.: 943,779

[22] Filed: Sep. 20, 1978

[30] Foreign Application Priority Data

Sep. 22, 1977 [LU] Luxembourg ............... 78167
Mar. 16, 1978 [LU] Luxembourg ............... 79251
Mar. 16, 1978 [LU] Luxembourg ............... 79252
Mar. 28, 1978 [LU] Luxembourg ............... 79317
Jun. 12, 1978 [LU] Luxembourg ............... 79797

[51] Int. Cl.³ ........................... B23K 27/00
[52] U.S. Cl. .................. 219/121 LJ; 219/121 LH; 219/121 EK; 219/121 EJ
[58] Field of Search ..... 219/121 L, 121 LM, 121 EB, 219/121 EM, 121 EK, 121 EJ, 121 LJ, 121 LH; 82/2 D, 5, 1.1; 10/1 R

[56] References Cited

U.S. PATENT DOCUMENTS

| | | | |
|---|---|---|---|
| 3,216,293 | 11/1965 | Ruehmer | 82/2 D |
| 3,244,094 | 4/1966 | Gresha | 156/639 X |
| 3,404,254 | 10/1968 | Jones | 219/121 LJ X |
| 3,534,472 | 10/1970 | DeJong et al. | 219/121 LM |
| 3,597,578 | 8/1971 | Sullivan et al. | 219/121 LM |
| 3,841,200 | 10/1974 | Berthiez | 82/2 D |
| 4,065,656 | 12/1977 | Brown et al. | 219/121 LM |
| 4,074,104 | 2/1978 | Fulkerson | 219/121 LM |
| 4,087,672 | 5/1978 | Yi | 219/121 LM |
| 4,131,782 | 12/1978 | Einstein et al. | 219/121 LK |
| 4,200,382 | 4/1980 | Friedman | 219/121 L X |

FOREIGN PATENT DOCUMENTS

| | | |
|---|---|---|
| 279413 | 10/1928 | United Kingdom . |
| 783525 | 9/1957 | United Kingdom . |
| 1174476 | 12/1969 | United Kingdom . |
| 1293576 | 10/1972 | United Kingdom . |
| 1486321 | 9/1977 | United Kingdom . |

*Primary Examiner*—C. L. Albritton
*Attorney, Agent, or Firm*—Holman & Stern

[57] ABSTRACT

In order to improve the surface characteristics of steel structure, it is proposed according to the invention to make at least one roll of a rolling-mill with a motif or pattern of motifs. The invention also includes apparatus for marking the roll which includes means for driving the roll marking device itself from the roll so that proper synchronization between the movements of the roll and marking device is achieved.

18 Claims, 3 Drawing Figures

METHOD AND DEVICE FOR IMPROVING THE PROPERTIES OF THIN STEEL PLATES

This invention relates to a method and device for improving the properties of thin steel plates, for example for pressing, and in particular to reduce their tendency to seize, without harming their appearance after painting.

It is known that cold-rolled plates possess a surface which, on a microscopic scale, is not perfectly flat, and instead comprises alternating depressions and peaks. The depressions in the surface are generally known as "valleys" and the peaks as "plateaus". The distribution, shape and dimensions of the "valleys" and "plateaus" seems to influence the reaction of the plate surface in contact with the pressing tool, and consequently condition the behaviour of the plate during such an operation. In particular, these factors play an especially important role in the problem of seizing during deformation, and influence the appearance of the surface after painting the pressed piece. Thus in certain cases, tests have shown that, other things being equal, plateaus of larger dimensions can make the plate less subject to seizing, and in addition a uniform and homogeneous surface morphology together with certain plateau dimensions (for example plateaus not too high) favour a good plate appearance after painting.

The condition of the plate surface is determined by rolling-mill rolls, and for example in the case of cold-rolled thin plates, the final morphology of the surface is formed, inter alia, during the skin-pass.

It has therefore been sought to prepare the surface of the rolling-mill rolls in order to give the plate surface a determined morphology.

Up to the present time, this preparation of the surface of rolling-mill rolls has consisted in a shot-blasting operation, which has the drawbacks of being costly, of not being reproducible in terms of the shapes and dimensions of the plateaus and valleys, of not allowing the depth of the cylinder roughness to be controlled, and of having to take account of the hardness of the constituent alloy of the rolls.

The applicant has conceived the original idea that the required object (improvement of the properties of plates without harming their appearance after painting) could only be attained by preparing the surface of rolling-mill rolls at the microscopic level (unevenness of the order of a few microns).

To this end, the applicant has examined the possibilities of utilizing known methods of imprinting and engraving designs on plates for the purpose of giving them a decorative appearance. Certain of these methods use a photosensitive resin, with the aid of which a screen of suitable form is impressed directly on the plate, and this screen is then engraved by chemical attack. Such an application makes it necessary to set up conditions for marking the surface of a rolling-mill roll on a microscopic scale, and this constitutes precisely one of the objects of the present invention.

Furthermore, during his wide research, the applicant has unexpectedly found that the microscopic marking carried out in accordance with the present invention also enables the ability of the surface to accept a further coating to be increased, even if the plate has still to undergo heat treatment with a surface soiled for example with greasy material (lubricant), without it being necessary to carry out any special cleaning operation, as is inevitably the case in current practice.

The present invention provides a method for overcoming these drawbacks, by giving the surface the most appropriate morphology together with good reproducibility and uniformity.

The method according to the present invention, in which the final morphology of the plate surface is determined by contact with at least one rolling-mill roll, is essentially characterized in that the surface of said rolling-mill roll comprises a design constituted by at least one motif or an assembly of motifs, either similar or different, which are reproduced at predetermined intervals without discontinuity, the nominal dimensions of each of these motifs lying preferably between 2 and 15 microns in height and between 30 and 250 microns in plan.

The reproduction of the motif constituting the design according to the invention can be carried out in at least two directions in the form of a two-dimensional network.

The motif used to constitute the required design can take various forms, such as for example a small dimensional star, triangle, body of revolution etc., or a combination of these different forms.

According to a first method of the invention, the motif or motifs are reproduced by feeding an intermittent energy ray of adjustable intensity in the direction of the roll such that it scans the entire surface of the roll in accordance with a helical trajectory, the ray being capable of locally disintegrating the constituent material of said roll or of a coating previously deposited on said roll.

It may be necessary to adjust the intensity of the intermittent energy ray during marking, in accordance with the configuration of the surface to be marked (convex) and the rolling conditions.

According to the invention, the ray is advantageously displaced relative to the cylinder by means of a preferably mobile deflector, appropriate to the nature of the ray.

Again according to the invention, a helical trajectory is obtained by displacing the ray parallel to the roll axis, rotating the roll, and synchronizing these two movements.

The energy ray according to the invention is advantageously a laser ray having a power exceeding 100 Watts.

Preferably, the laser ray has a pulse frequency exceeding 5,000 hertz, for the purpose of ensuring satisfactory efficiency of the marking operation.

In the case of the laser, the deflector can be a rotary mirror.

According to one modification of the invention, the energy ray is an electron beam. In this case, the deflector can be an electrical or magnetic field source.

According to a further method of the invention, the motif or motifs are reproduced by means of a substance which resists chemical attack, the uncovered parts of the roll being attacked chemically or electrochemically, and the attacked parts being subjected to possible rinsing, and to chemical neutralization.

The cylinder is attacked chemically at those positions not protected by the film representing the design, by means of an acid, for example nitric or hydrochloric, or a mixture of acids, diluted in water or alcohol, for a certain time such as to enable the depth of the design to be controlled.

Alternatively, the roll is attacked electrochemically at the positions not protected by the film representing the design, by establishing a potential difference between said roll, which serves as the attacked electrode, and an auxiliary electrode, the two electrodes being immersed in a suitable electrolyte.

After the attack and possible rinsing, the roll is then neutralized for example by a solution of borax or sodium carbonate. Finally, the roll is cleaned, and the remaining film is removed.

According to one modification of the invention, it is possible to place the roll provided with the film representing the design in an electrolyte cell, such that those parts of said roll not protected by the film become coated with a very resistant product.

Possibly, according to the invention, the roll surface can be advantageously subjected to a well known preparation treatment designed to ensure good adherence of the substance used for forming the design.

According to the invention, in the case in which the motif or motifs are reproduced by means of an intermittent energy ray capable of locally disintegrating the material of a coating previously deposited on the roll, said coating is constituted of a substance which resists chemical attack. After reproducing the motif or motifs, the uncovered parts are attacked, and rinsing and neutralization are carried out as stated heretofore.

Again according to the invention, the motif or motifs are reproduced by causing a tool carrying the motif or motifs to be reproduced to make contact with the roll surface along a suitable trajectory, preferably helical, after coating said tool with the substance resistant to chemical attack.

The motif or motifs can be reproduced in a succession of bands parallel to the generating lines of the roll, the surface of said roll being divided into a whole number of bands, the width of which is constant, or, as a modification, into a succession of helixes described about the roll, reproduction being carried out motif by motif, or motif group by motif group.

It is equally possible to reproduce the motif or motifs by the successive impressing of judiciously chosen components. By way of example, it should be noted that two helix systems, one left handed and the other right handed, produce parallelograms.

The reproduction system can consist of one or more embossed wheels, with the substance resistant to chemical attack being advantageously uniformly distributed over the reproduction tool, for example by means of a succession of rubber inking rollers.

According to one modification of the invention, the motif or motifs are reproduced on the roll surface by displacing a tool carrying the motif or motifs to be reproduced, along a flexible band wound wholly or partly, and preferably helically, about said roll, and impregnated with the substance resistant to chemical attack.

According to a further modification of the invention, the motif or motifs are reproduced by coating the roll with a photosensitive substance resistance to chemical attack, exposing said substance to a suitable active light by way of a mask carrying the motif or motifs to be reproduced, and making the design visible by means of a developer which dissolves the photosensitive substance in those positions which have either been struck or not been struck by the light, according to the nature of said substance.

The photosensitive substance (resin) is deposited on the roll surface by a gun or by brush or roller, or by immersion by rotating the partly immersed roll to be coated. This film can have a thickness of between 3 and 12 microns.

Said dissolving can be carried out by means of a developer such as a solution of caustic soda on the regions exposed to the light, this being applicable to those resins which depolymerize under the action of ultraviolet radiation. As a modification, said dissolving can be carried out by means of a solvent such as trichloroethylene or acetone on the regions not exposed to light during imprinting, this being applicable to those resins which polymerize under the action of ultraviolet radiation. According to a further modificarion, part of the photosensitive product is dissolved by means of a solvent which acts only on the exposed or non-exposed regions according to the type of photosensitive product, then the regions uncovered in this manner are filled with a hardening product such as a lacquer, and finally the remainder of the resin is dissolved by a solvent which does not act on the hardening filling product.

It is advantageous to apply the masks pneumatically, so as to be able to take account of the convexity of the roll.

In order to prevent any discontinuity in the design when effected in a succession of bands parallel to the roll generating lines, a system which divides the roll contour into a whole number of equal parts is used in passing from the exposure of one generating line to the exposure of the next generating line.

From tests carried out up to the present time, an exposure time has been obtained of the order of 0.05 seconds for a photosensitive film 7 microns thick.

According to one method of the invention, the mask is constituted by a design of material which is opaque to the exposure light and is impressed on the photosensitive substance by means of a tool carrying the motif or motifs to be reproduced.

According to a further method of the invention, the mask is constituted by a flexible band wound wholly or partly, and preferably helically, about the rolling-mill roll and carrying the motif or motifs to be reproduced.

The flexible band is advantageously wound and unwound continuously to describe a helix portion about the roll, and the contact surface is exposed during contact between the band and the photosensitive substance.

This method has the advantage of allowing illumination over more or less one half of a revolution of the roll, and thus, for equal sensitivities, allows the exposure time to be reduced in relation to a "motif by motif" method.

According to the invention, the flexible band is transparent and the motifs to be reproduced are opaque to the exposure light.

When the opaque design is obtained by depositing on the photosensitive substance an opaque product representing the design, the photosensitive substance is preferably of the type which polymerizes under the action of the light.

When the opaque design is obtained by depositing on the photosensitive substance a uniform opaque film which is then worked for example mechanically, so as to create the design, the photosensitive substance is preferably of the type which depolymerizes under the action of the light.

The choice of the two types of photosensitive substance for each method described heretofore is made such that if the substance is altered by the deposition or the working of the opaque product, this alteration affects those parts of said substance which are removed on development.

According to a modification of the invention, the flexible band is a very thin metal sheet, for example of the order of 0.05 mm thick, perforated with holes in accordance with the motif or motifs to be reproduced.

The reproduction system can be an optical image reduction system such as an inverted microscope, or as an alternative, can consist of optical fibres which conduct the light from the source to the photosensitive substance, to form a point.

The reproduction system according to the invention is advantageously provided with a shutter. In this case, the shutter and roll movements are synchronized so as to obtain relative repose between the motif reproduced and the roll, and thus prevent image deformation.

According to the invention, the exposure light is composed mainly of ultraviolet radiation.

Again according to the invention, the source of the exposure light is a laser.

The present invention also relates to a device for effecting the method described heretofore under satisfactory conditions, in relation both to the quality of reproduction and to the ease of setting-up the device.

Before defining its characteristics in detail, one actual example will be described.

One of the methods which comes directly to mind for uniformly applying a determined motif to a cylindrical surface consists of rotating the object comprising said surface about its axis, bringing a marking member for the motif into contact therewith and displacing it at an appropriate speed along a generating line of the surface.

Generally, the said rotation is carried out by supporting the object under consideration between centres. However, such a method is hardly possible with a rolling-mill roll which can weigh several tons and which cannot be fixed only between centres without danger.

Furthermore, in the case of said rolls, it is not possible to exclude a slight longitudinal displacement along the axis of the centres, nor a certain variability in speed, having regard to their mass.

Even in the case of large rolling-mill rolls, the device according to the invention allows uniform marking thereof without difficulty and with sufficient accuracy.

The invention will be further described with reference to the accompanying diagrammatic drawings, which show two embodiments of apparatus for reproducing a design on a roll. In the drawings:

FIG. 1a is an enlarged section of a detail of FIG. 1; and

FIG. 1 is a diagrammatic representation, not to scale, of one example of the device according to the invention.

Figure 1:
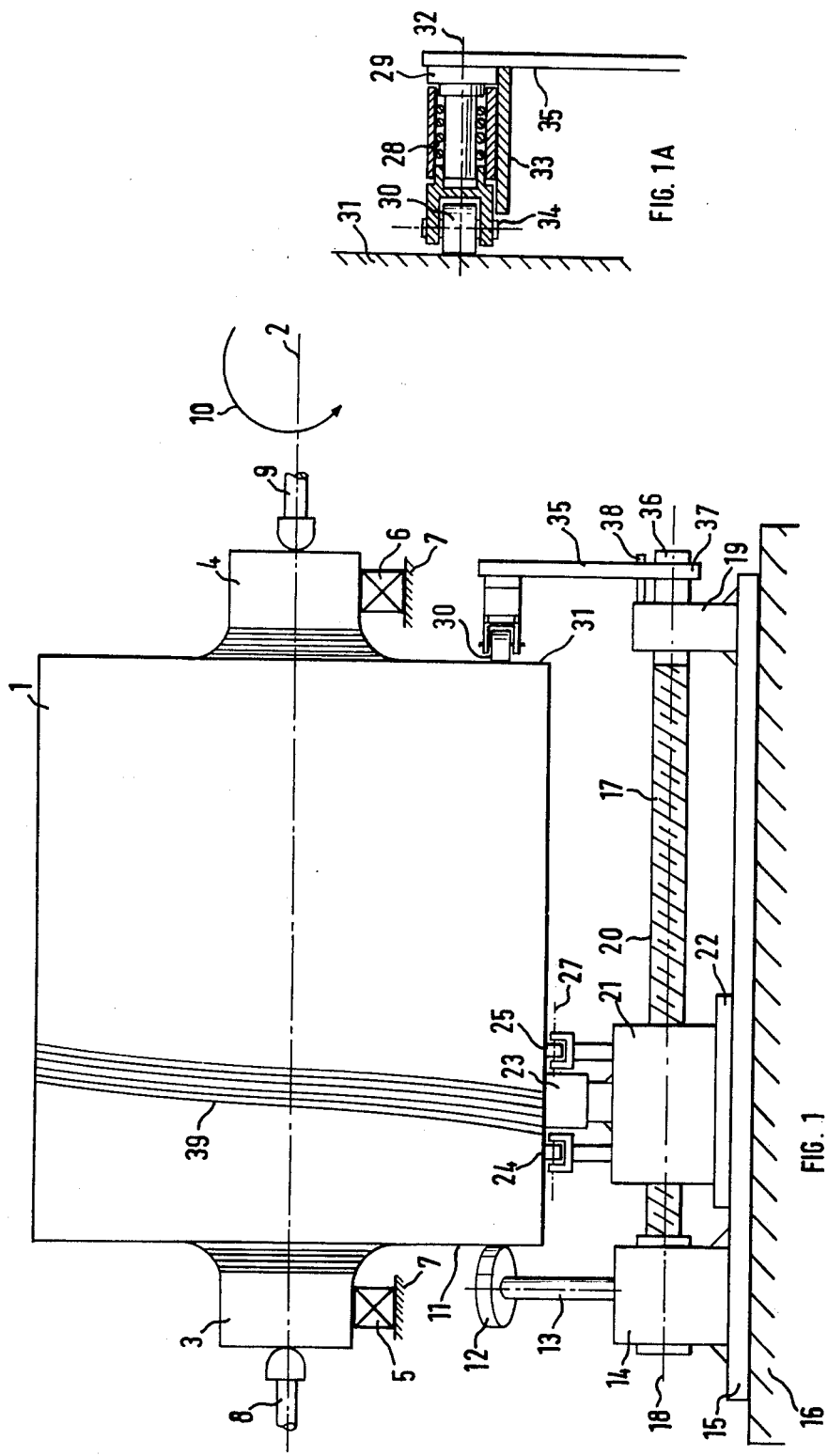
FIG. 1 is a diagrammatic elevation, not to scale, showing one embodiment of the invention.

In this figure, a rolling-mill roll 1, the axis of which is represented by 2, rests by its two trunnions 3 and 4 on two support bushes (or half bearings) 5 and 6, which are coaxial to the axis 2 and which allow the roll 1 to rotate about its axis. The two bushes are rigid with a fixed foundation indicated by the reference numerals 7 and 7'. The roll 1 is protected against any exaggerated axial displacement by the two stops 8 and 9 which act respectively against each of the trunnions, and is rotated in the direction of the arrow 10 about its axis 2 by appropriate means, not shown.

During its rotation, the roll is in contact at the periphery of one of its end faces 11 with a roller 12, which it rotates with a shaft 13 solid therewith. The shaft 13 passes into a speed reducer 14 fixed on a sole plate 15 able to slide on a base 16. A shaft 17, the axis 18 of which is parallel to the axis 2, is driven by the rotation of the shaft 13, for example by way of a worm disposed in the reducer 14, and is supported at one end in the reducer 14 and at the other end by an end bearing 19 also fixed on the sole plate 15.

The shaft 17 comprises a threaded portion 20 over substantially the whole of its length, between the reducer 14 and bearing 12, and thus constitutes a lead screw.

This threaded portion drives a threaded block 21 with a straight-line movement parallel to its axis 18, and of which any rotation about said axis is prevented by a bedplate 22 rigid with the block 21 and in sliding contact with the sole plate 15. The threaded block 21 serves as a support for a roll marking device 23, and is rigid therewith. Two rotation rollers 24 and 25, idle on their axles 26 and 27, parallel to the axis 2 and supported by the block 21, maintain a suitable distance between the surface of the roll 1 and the working face of the marking device 23. The roller 12 is kept against the end face 11 of the roll by a spring 28 (see FIG. 1a) which rests at one end against a ledge 29 and at the other end urges a roller 30 against the end face 31 of the roll. Rotation of the roller 30 about the axis 32 of the spring 28 is prevented by any known means, for example by a simple plate 33 rigid with ledge 29 and opposing any rotational movement of the support stirrup 34 for the roller 30. The spring 28 has a second use, namely to give automatic compensation of any difference between the roller 12 and roller 30 along the length of the roll, during its rotation. This entire thrust device is made rigid with the bearing 19 by an arm 35 bolted on to 19, or centred on the exit end 36 of the shaft 17, this end being able to turn freely in the centering eyelet 37. In this case, the arm 35 is prevented from rotating by a stud 38 fixed into 19 to keep the position of said arm 35 fixed relative to the bearing 19.

It should be noted that the arm 35 has a rigidity sufficient to cause the entire system rigid with the sole plate 15 to follow the small axial movements of the roll, which are allowed by the slack of the roll positioning members.

Conceived in this manner, the device operates as follows.

Figure 2:
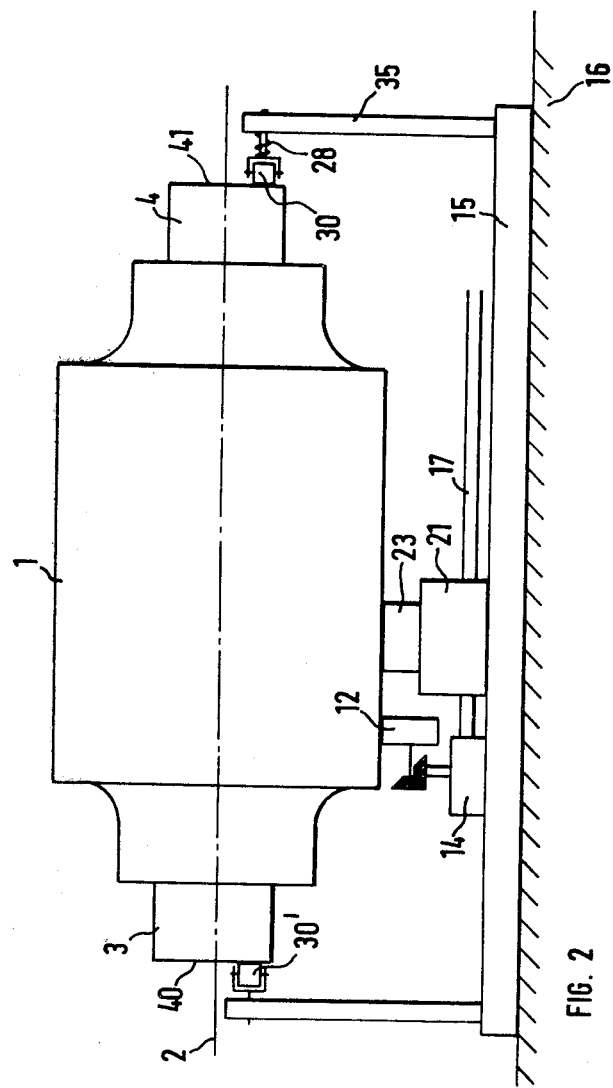
FIG. 2 is a diagrammatic elevation of a further embodiment.

When the roll 1 is rotated in the direction of the arrow 10, it rotates the roller 12 and, by way of the axle 13, the reducer 14, the screw 17 and the threaded block 21, to displace the marker 23 in a direction parallel to the axis 2. The contact between the marker 23 and the roll 1 thus results in the inscribing of a helix 39 or a plurality of helices. The characteristics of the transmission of movement between the roll and marker are such that as the roll rotates through 360° about its axis, the marker becomes displaced along the generating line by the roll by a distance determined such that successive design whorls become correctly impressed one beside the other, without leaving any unmarked space (taking account however of the inevitable interspace separating two adjacent designs not intended to touch each other). It will be noted that in the device heretofore described, it is the roll itself which moves the marking device, which thus automatically follows any variation in the rotational movement of said roll. This represents an important advantage in terms of uniformity of the design marked on the roll.

Where an end face of the roll, such as 11, is not available, it is possible without leaving the scope of the present invention to move the position of the roller 12, fixed relative to the sole plate 15, against the cylindrical surface of the roll, the position of the sole plate 15 relative to the roll then being determined on the one hand by the roller 30 which rests this time against the end face 41 of the trunnion 4, and on the other hand by an auxiliary reference roller 30' which rests in a non-resilient manner on the end face 40 of the trunnion 3 and is fixed to the sole plate 15 in a suitable manner. This method is represented very diagrammatically in FIG. 2. As a modification of this second case, it is possible to block any axial displacement of the roll 1, when the sole plate 15 will no longer slide on the base 16. The entire device is then blocked with regard to any axial displacement. In this case it is also possible to use an auxiliary reference face similar to 11, obtained by fixing on the corresponding trunnions a ring with a face perpendicular to the roll axis.

Reference should then again be made to the diagram of FIG. 1.

Having thus described one example of the device which enables the entire method for marking a rolling-mill roll to be effected by helical scanning of the roll surface to be marked, its essential characteristics can now be defined.

The device according to the present invention for carrying out a method for marking a rolling-mill roll on its cylindrical surface is essentially characterized by comprising, resting on a foundation:

(a) a sole plate, possibly able to slide on the foundation, (b) means, resting on supports fixed relative to the sole plate, for displacing a roll marking head along a straight-line and preferably horizontal path.

(c) means for supporting the roll by its trunnions in a position such that its axis is parallel to said straight-line trajectory, and its surface rests in contact with the marking head during said path, (d) means for rotating the roll about its axis, (e) means for displacing the marking head by way of said roll, (f) a member for transmitting the axial displacement or displacements of the roll to the sole plate, and for annulling their relative displacement.

According to the invention, it has been found advantageous to constitute the means described under (b) as a lead-screw and threaded block, said block being rigid with the marking head and serving as a support for it during displacement under the action of the lead-screw. These means allow a particularly uniform feed to be obtained, without any slack or shock on the marking head.

Again according to the invention, the means described under (e) are constituted by a roller of fixed position, which is rotated by the roll (by its cylindrical surface, by one of its end faces, by one of its trunnions, by any other of its parts or by any other piece rigid therewith), said roller being fixed on a rotation axle provided with a member for controlling the displacement and possibly the operation of the marking head by any known means, such as pulleys, chains, a gear, worm, rack etc., preference however being given to the worm because of ease of adjustment.

The member for transmitting axial displacements of the roll can be a simple resilient stop.

We claim:

1. A method of marking a rolling-mill roll for use in improving the properties of thin steel plates, in which the final morphology of the steel plate surface is determined by contact with the rolling-mill roll, said method being characterized by the step of forming on a surface of said rolling-mill roll by destroying material on the surface of said roll a design constituted by at least one motif which is reproduced at predetermined intervals without discontinuity, the nominal dimensions of said motif lying between 2 and 15 microns in height and between 30 and 250 microns in plan.

2. A method as claimed in claim 1, characterised in that said motif is reproduced by feeding an intermittent energy ray of adjustable intensity in the direction of the roll such that it scans the entire surface of the roll in accordance with a helical trajectory, it being capable of locally disintegrating material on the surface of said roll.

3. A method as claimed in claim 2, wherein the ray is displaced relative to the cylinder by means of a mobile ray deflector.

4. A method as claimed in claims 2 or 3, characterised in that a helical trajectory is obtained by displacing the ray parallel to the roll axis of said rolling-mill roll, rotating rolling-mill roll, and synchronising displacement of the ray with rotation of the roll.

5. A method as claimed in claims 2 or 3, characterised in that the energy ray is a laser ray having a power exceeding 100 Watts.

6. A method as claimed in claims 2 or 3, characterised in that the energy ray is an electron beam.

7. A method as claimed in claim 1, characterised in that the motif is reproduced by means of a substance which resists chemical attack, covering the parts of the roll, the uncovered parts of the roll being attacked chemically, the attacked parts being subjected to rinsing and to chemical neutralization.

8. A method as claimed in claim 7, characterised in that before reproducing the motif the roll surface is treated to ensure good adherence of the substance used for forming the design.

9. A method as claimed in claims 7 or 8, in which the motif is reproduced by means of an intermittent energy ray capable of locally disintegrating the substance.

10. A method as claimed in claims 7 or 8, characterised in that the motif is reproduced by causing a tool carrying the motif to be reproduced to make contact with the roll surface along a suitable trajector after coating said tool with a substance resistanct to chemical attack.

11. A method as claimed in claims 7 or 8, characterised in that the motif is reproduced on the roll surface by displacing a tool carrying the motif to be reproduced along a flexible band wound about said roll and impregnated with a substance resistant to chemical attack.

12. A method as claimed in claim 7, characterised in that the motif is reproduced by coating the roll with a photosensitive substance resistant to chemical attack, exposing said substance to a suitable active light by way of a mask carrying the motif to be reproduced, and making the design visible by means of a developer which dissolves the photosensitive substance.

13. A method as claimed in claim 12, characterised in that the mask is constituted by a design of material which is opaque to the exposure light and is impressed on the photosensitive substance by means of a tool carrying the motif to be reproduced.

14. A method as claimed in claim 12, characterised in that the mask is constituted by a flexible band wound about the rolling-mill roll and carrying the motif to be reproduced.

15. A method as claimed in claim 14, characterised in that the flexible band is transparent and the motif to be reproduced is opaque to the exposure light.

16. A method as claimed in claim 14, characterised in that the flexible band is a very thin metal sheet, for example of the order of 0.05 mm thick, perforated with holes in accordance with the motif to be reproduced.

17. A method as claimed in claim 12, characterised in that the exposure light is composed mainly of ultraviolet radiation.

18. A method as claimed in claim 12, characterised in that the exposure light source is a laser.

* * * * *